April 18, 1944. C. C. GLASSMAN 2,346,744
BAIT BOX
Filed June 28, 1943
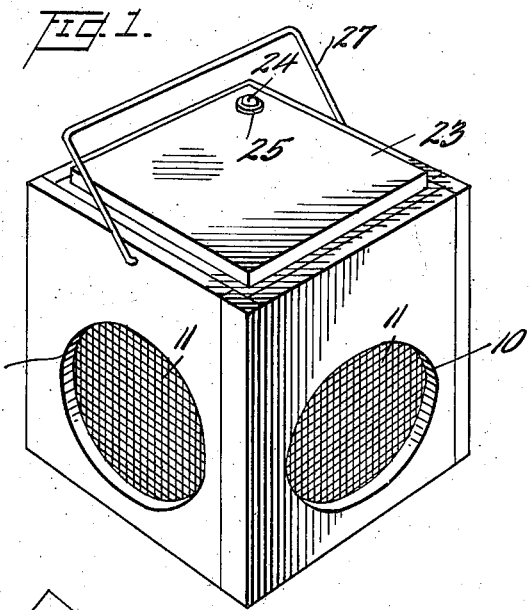
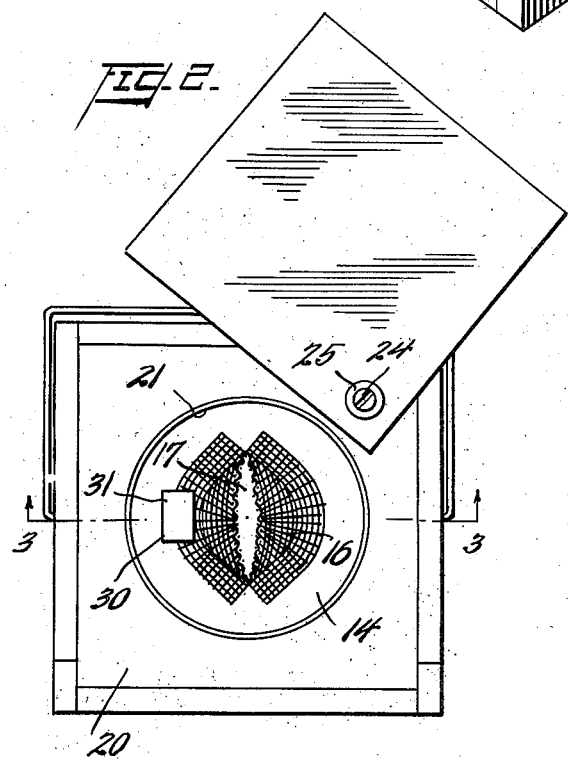
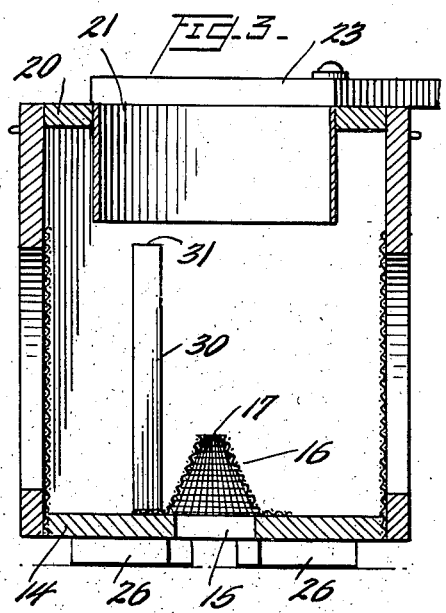
Inventor
Cleveland C. Glassman,
By Henry H. Snelling
Attorney Patented Apr. 18, 1944

2,346,744

UNITED STATES PATENT OFFICE 2,346,744

BAIT BOX

Cleveland C. Glassman, Jackson, Tenn.

Application June 28, 1943, Serial No. 492,613

4 Claims. (Cl. 43—55)

This invention relates to insect traps and has for its principal object the provision of a trap that will effectively catch and preserve insects for use as bait while fishing, serve as a seat for the fisherman, and afford convenient access to the bait when needed.

A prime object of the invention is to make an insect trap of wood in order that it may well serve as a home for such insects as are desired without the necessity of catching them on the day of use or shortly before that. While roaches soon die in a metal trap, they will live and breed in mine, so that I will constantly have live bait.

A further object of the invention is to provide means whereby a single roach may with greatest convenience be taken from the bait box. This object is accomplished by having within the box a climbing pole with its top within easy access of the exit hole or opening thru which the bait is taken for use.

A still further object of the invention is to fashion the trap and bait receptacle so that it will form a seat for the fisherman. The tackle may be reduced by this item as the box is both light and convenient to carry.

In the drawing, which represents the device as I have marketed it

Figure 1 is a perspective.

Figure 2 is a top plan view.

Figure 3 is a central section.

While there is nothing new in the combination of an insect trap with a bait bucket all of these devices are relatively heavy, unsuitable for a seat, and are not designed to keep the bait alive more than a very short time as roaches soon die in the heat when confined in metal pails or buckets. In my bait box I avoid these inconveniences and add the climbing pole so the fisherman may always be able to pick up one of the roaches (usually the largest one left) without any trouble.

As now manufactured the box has four sides of equal area, in at least two of which there are circular holes 10 located near the lower edge and these are lined on the inside with a screening material of any kind, such as wire cloth 11, which allows free circulation of air but yet keeps the roaches from leaving thru these openings. The four sides are nailed to the bottom 14 preferably with the wire cloth between the sides and the base to save stapling at that point. In the center of the bottom or base there is an entrance opening 15 leading to a wire cone 16 forming a well-known one-way trap, the top of which may be closed to leave a space of about a quarter of an inch as indicated in Figure 2 at 17.

The top panel 20 likewise has an opening, this hole 21 being much larger, preferable about four inches across, to accommodate a fairly large sized hand. It is bounded with a downwardly extending sleeve of stove pipe iron to prevent the insects from crawling out of the trap when they have reached the ceiling or lower surface of the top panel. The cover 23 is large enough and sufficiently strong to support the user. It may slide to close the opening 21 but it is just as easy to provide a pivot by the single screw 24 and washer 25. The cleats 26 at the bottom are conventional and extend radially of the entrance opening. The bail 27 differs from the usual bail only in that it is rectangular in order better and more snugly to engage the box when not in use.

The climbing post 30 is an important item in my invention as it positions the bait in the most convenient location for ready and easy removal. It is a mere bar of wood in unfinished condition and hence is rough enough to facilitate the climbing of the roach and to afford sufficient space at its top 31 for resting. This top 31, as best seen in Figure 2 is well within the circle of the exit opening 21 and lies within the top half of the box in easy reach of the fingers extending thru the hole. The roach tends to crawl up this climbing pole not only thru its natural climbing instinct but likewise because it is darker up there, the side openings being located near the bottom to produce this effect. When only two of the sides are provided with openings these two sides may, if desired, be each close to a wall with the trap in the corner of a room to make the interior darker and more inviting.

The trap is baited with any of the usual food. When free of priorities slices of bananas or raw potatoes are best but bread will do. The baited trap is placed in any roach infested location where there is food, warmth, and dim light. When ready for fishing the user merely picks up the bait box, lowers the bail and he is ready and is assured of a fairly comfortable seat.

What I claim is:

1. In a bait box, a receptacle having a top with an exit opening, a bottom with an entrance opening, a pair of sides meeting to form a right angle and each having an opening therein near the bottom of the receptacle, a reticulate member covering each side opening to admit light while preventing loss of the bait, a plurality of other sides, a one-way trap covering the entrance opening, and a solid, imperforate member forming a closure for the exit opening and affording a seat for the user.

2. A bait box consisting of a receptacle having an opening in the top thereof of such size as to conveniently receive the hand of a fisherman, a closure for the opening, and a rough surface climbing post within the bait box rising to a point within convenient access thru the opening, whereby a roach resting upon the top of the climbing post may be withdrawn quickly and easily.

3. The device of claim 2 in which the top of the climbing post is within the top half of the receptacle and means are provided in the lower portion of the box for admitting light and air, whereby the top of the post will be darker than the bottom thereof.

4. In a bait box, a receptacle having a bottom with an entrance opening therein, a top with a circular opening therein with a diameter exceeding three inches, a baffle surrounding said opening, four sides of which a plurality have an opening thru the side near the bottom for entry of air, means for preventing the bait from leaving thru the side openings, a one-way trap for the entrance opening, a climbing post proximate the entrance opening and extending to a point adjacent and below the circular opening in the top, and a solid member substantially covering the top of the receptacle and affording a seat for the fisherman.

CLEVELAND C. GLASSMAN.